United States Patent
Vitt et al.

(10) Patent No.: US 9,016,265 B2
(45) Date of Patent: Apr. 28, 2015

(54) EXHAUST GAS RECIRCULATING VALVE FOR AN INTERNAL COMBUSTION ENGINE

(75) Inventors: Stefan Vitt, Grevenbroich (DE); Osman Sari, Grevenbroich (DE); Gérard Dietz, Roemmerskirchen (DE)

(73) Assignee: Pierburg GmbH, Neuss (DE)

( * ) Notice: Subject to any disclaimer, the term of this patent is extended or adjusted under 35 U.S.C. 154(b) by 200 days.

(21) Appl. No.: 13/818,686

(22) PCT Filed: Aug. 3, 2011

(86) PCT No.: PCT/EP2011/063353
§ 371 (c)(1),
(2), (4) Date: Feb. 25, 2013

(87) PCT Pub. No.: WO2012/025351
PCT Pub. Date: Mar. 1, 2012

(65) Prior Publication Data
US 2013/0167791 A1   Jul. 4, 2013

(30) Foreign Application Priority Data
Aug. 26, 2010 (DE) .......................... 10 2010 035 622

(51) Int. Cl.
F02M 25/07 (2006.01)

(52) U.S. Cl.
CPC ......... *F02M 25/079* (2013.01); *F02M 25/0789* (2013.01); *Y02T 10/121* (2013.01)

(58) Field of Classification Search
CPC .......... F02M 25/0701; F02M 25/0718; F02M 25/0789
USPC ............ 123/568.11, 568.17, 188.2; 701/108; 251/214, 318
See application file for complete search history.

(56) References Cited

U.S. PATENT DOCUMENTS

| | | | | |
|---|---|---|---|---|
| 3,599,992 | A * | 8/1971 | Kammeraad | 277/502 |
| 4,811,960 | A * | 3/1989 | Stritzke et al. | 277/502 |
| 7,429,028 | B2 * | 9/2008 | Tanaka et al. | 251/214 |
| 7,503,316 | B2 * | 3/2009 | Fujita et al. | 123/568.11 |
| 2002/0185624 | A1 | 12/2002 | Bircann | |
| 2004/0041115 | A1 | 3/2004 | Geib et al. | |
| 2004/0065860 | A1 * | 4/2004 | Bircann | 251/214 |
| 2005/0082507 | A1 * | 4/2005 | Tanaka et al. | 251/318 |
| 2007/0007480 | A1 | 1/2007 | Busato et al. | |

(Continued)

FOREIGN PATENT DOCUMENTS

| | | |
|---|---|---|
| DE | 43 38 192 A1 | 5/1995 |
| DE | 103 36 976 A1 | 3/2005 |

(Continued)

*Primary Examiner* — Mahmoud Gimie
(74) *Attorney, Agent, or Firm* — Norman B. Thot

(57) ABSTRACT

An exhaust gas recirculation valve for an internal combustion engine includes a housing comprising an exhaust gas inlet and an exhaust gas outlet, and a valve closing body fastened to a valve rod. The valve rod is movable. A valve seat is arranged between the exhaust gas inlet and the exhaust gas outlet. A guide bushing comprising a first section guides the valve rod in the housing. A sealing ring is arranged at an end of the guide bushing remote from the valve closing body. The valve closing body is lowered onto the valve seat by a movement of the valve rod and lifted from the valve closing body by an opposite movement of the valve rod. A circumferential gap is formed between the valve rod and the guide bushing in the first section of the guide bushing directed toward the sealing ring.

8 Claims, 2 Drawing Sheets

(56) References Cited

U.S. PATENT DOCUMENTS

| | | | |
|---|---|---|---|
| 2007/0017475 A1 | 1/2007 | Ihara et al. | |
| 2007/0194260 A1 | 8/2007 | Seiyama et al. | |
| 2007/0240690 A1* | 10/2007 | Nanba | 123/568.18 |
| 2007/0246677 A1* | 10/2007 | Bircann | 251/214 |
| 2008/0295812 A1* | 12/2008 | Fujita et al. | 123/568.11 |

FOREIGN PATENT DOCUMENTS

| | | |
|---|---|---|
| DE | 10 2004 048 958 A1 | 5/2005 |
| DE | 10 2005 035 034 A1 | 2/2007 |
| EP | 1 605 155 A2 | 12/2005 |
| EP | 1 683 945 A1 | 7/2006 |
| JP | 8-121262 A | 5/1996 |
| JP | 8-177853 A | 7/1996 |
| JP | 2002-285918 A | 10/2002 |
| JP | 2005-127147 A | 5/2005 |
| JP | 2006-46641 A | 2/2006 |
| JP | 2006-090200 A | 4/2006 |
| JP | 2008-190504 A | 8/2008 |
| JP | 2010-144738 A | 7/2010 |
| KR | 10-2007-0010362 A | 1/2007 |

* cited by examiner

# EXHAUST GAS RECIRCULATING VALVE FOR AN INTERNAL COMBUSTION ENGINE

CROSS REFERENCE TO PRIOR APPLICATIONS

This application is a U.S. National Phase application under 35 U.S.C. §371 of International Application No. PCT/EP2011/063353, filed on Aug. 3, 2011 and which claims benefit to German Patent Application No. 10 2010 035 622.0, filed on Aug. 26, 2010. The International Application was published in German on Mar. 1, 2012 as WO 2012/025351 A1 under PCT Article 21(2).

FIELD

The present invention relates to an exhaust gas recirculation valve for an internal combustion engine comprising a housing having an exhaust gas inlet and an exhaust gas outlet, a valve closing body, a valve rod on which the valve closing body is fixed and which can be moved by an actuator, a valve seat between the exhaust gas inlet and the exhaust gas outlet, wherein the valve closing body can be lowered onto said valve seat by moving the valve rod and the valve closing body can be raised from said valve seat by an opposing movement, a guide bushing via which the valve rod is guided in the housing, and a sealing ring which lies on the guide bushing end opposite the valve closing body.

BACKGROUND

Exhaust gas recirculation valves for the recirculation of exhaust gas quantities adjusted to the respective operating state of the internal combustion engine in order to reduce environmentally harmful portions, in particular, nitrogen oxides, in the exhaust gas of an internal combustion engine are generally known and are described in a large number of applications. These exhaust gas recirculation valves typically comprise an actuator operatively connected with a valve rod which is guided in a housing of the valve by means of a guide bushing and comprises, at its end remote from the actuator, at least one valve closing body corresponding to a respective valve seat. Most such exhaust gas recirculation valves are configured such that, in the closed state of the valve, the guide bushing is located in the region containing fresh air and is separated from the exhaust gas side by the valve closing body. When the valve is opened (i.e., the valve closing body is lifted from the valve seat), however, exhaust gas flows in the direction of the intake pipe so that a connection is allowed between the exhaust gas, charged with soot or other caking and sticky substances, and the guide bushing, whereby, not least because of the temperature differences, accretions are formed on the valve rod and in the guide bushing, respectively, that can affect the functioning of the valve.

Various suggestions have been made to avoid such accretions on the valve rod and in the guide bushing, but also in the interest of preventing functional disorders of electric components in the vicinity of the actuator, such as electromagnets, electric motors or potentiometers, by exhaust gas components.

In order to avoid the ingression of dirt particles into the vicinity of the actuator, DE 103 36 976 describes providing a valve rod seal in the form of a radial sealing ring. Such a valve rod seal is, however, worn after a short operating time and thus loses its sealing function since accretions between the guide bushing and the valve rod cause scratching in the valve rod in the region adjacent to the sealing ring. These possibly sharp edges are passed along the sealing ring and may in turn cause small tears. Leakiness and/or jamming of the valve may result.

Another form of sealing is described in DE 43 38 192 A1. With the valve disclosed therein, a rib is arranged in the region of the clean gas side, which rib is supposed to protect the guide body from thermal radiation and soiling. The valve rod is additionally connected with an elastic membrane that is to seal the control chamber from the exhaust gas outlet. Such a design is a rather complex structure, however, since a plurality of additional components must be used to seal the valve body. The provision of the sealing membrane, in particular, requires additional assembling effort and the production costs caused by a housing with a rib are higher than for a housing without a rib. Accretions moreover accumulate in the region between the guide bushing and the valve rod that lead to a jamming of the valve.

A drawback of the known embodiments is that dirt particles entering between the guide bushing and the valve rod cause functional disorders of the valve by the formation of ridges or scratches in the valve rod or by the accretions themselves. This may also affect the protection of the actuator from dirt particles, resulting in malfunctions of the electric components.

SUMMARY

An aspect of the present invention is to provide an exhaust gas recirculation valve where a long service life without malfunctions of the valve is provided and where the assembly effort is low. An alternative aspect of the present invention is to provide an exhaust gas recirculation valve where damage to the sealing elements and jamming by accretions or scratches in the valve rod is prevented.

In an embodiment, the present invention provides an exhaust gas recirculation valve for an internal combustion engine which includes a housing comprising an exhaust gas inlet and an exhaust gas outlet, a valve closing body, and a valve rod to which the valve closing body is fastened. The valve rod is configured to be movable. A valve seat is arranged between the exhaust gas inlet and the exhaust gas outlet. A guide bushing comprising a first section is configured to guide the valve rod in the housing. A sealing ring is arranged at an end of the guide bushing remote from the valve closing body. The valve closing body is configured to be lowered onto the valve seat by a movement of the valve rod and to be lifted from the valve closing body by an opposite movement of the valve rod. A circumferential gap is formed between the valve rod and the guide bushing in the first section of the guide bushing directed toward the sealing ring. By forming a circumferential gap between the valve rod and the guide bushing in a first section of the guide bushing directed toward the sealing ring, friction between the valve rod and the guide bushing in said region is avoided. Scratches formed in this region that could cause the destruction of the radial sealing ring are therefore avoided.

BRIEF DESCRIPTION OF THE DRAWINGS

The present invention is described in greater detail below on the basis of embodiments and of the drawings in which.

DETAILED DESCRIPTION

Figure 1:
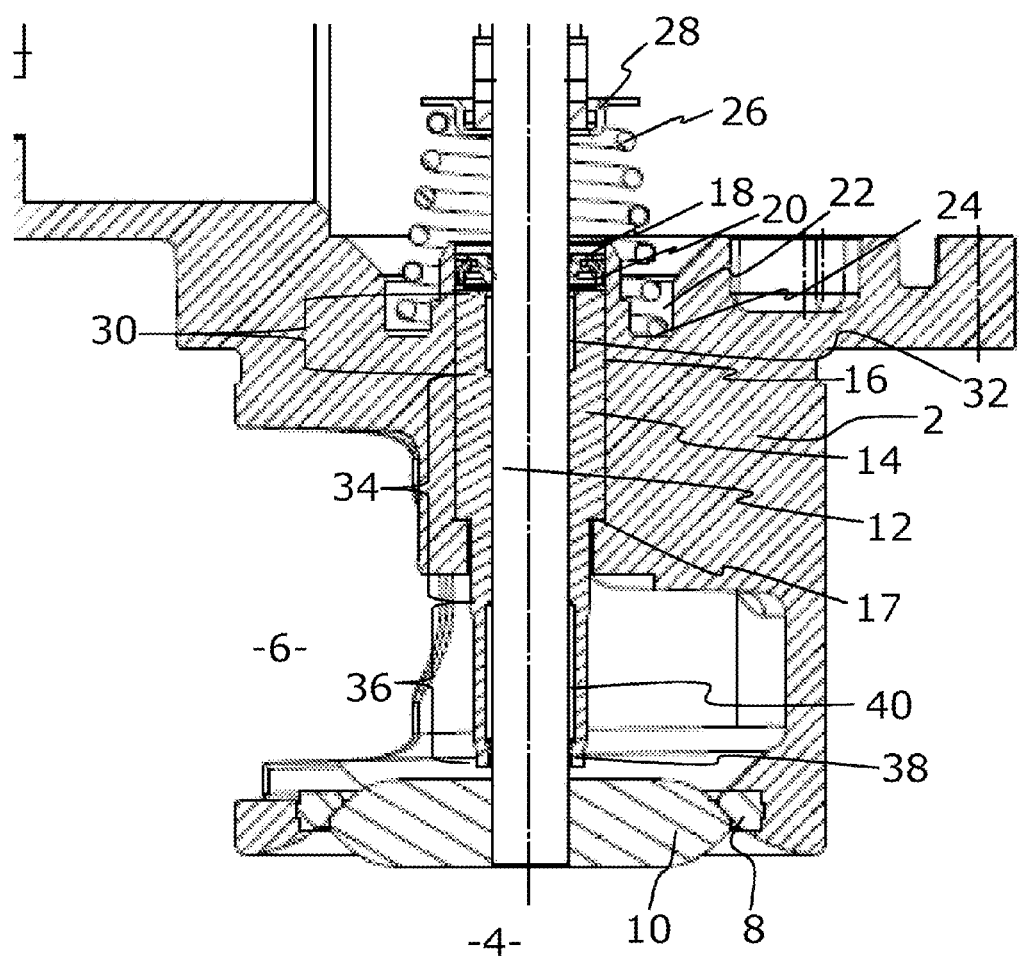
FIG. 1 shows a sectional side elevational view of a detail of a first embodiment of an exhaust gas recirculation valve according to the present invention.

In an embodiment of the present invention, the height of the gap can, for example, be larger or equal to the height of stroke of the valve closing body. It is thereby excluded that the section sliding in the guiding portion of the guide bushing, where scratches and edges could be formed due to their sliding directly on each other, can contact the sealing ring when the valve is closed. The tightness and the service life of the sealing ring are thereby increased.

In an embodiment of the present invention, a guiding section of the guide bushing adjoins the first section, whose end facing toward the valve closing body is formed with a sharp edge. This sharp edge serves as a scraping edge at which accretions on the valve rod are sheared off as the valve is closed, whereby the intrusion of contaminations into the rather short sliding portion is largely avoided.

In an embodiment of the present invention, the guiding section is joined by a third section in the direction towards the valve closing body in which a second gap is formed between the guide bushing and the valve rod, wherein the end of the guide bushing directed toward the valve closing member is provided with a constriction reducing the second gap. In this gap, dirt can accumulate without causing friction in the sliding portion which could lead to scratches in the rod or in the guide bushing. This section, which extends into the space through which exhaust gas flows, additionally serves as a shield for the valve rod.

In an embodiment of the present invention, the axial ends of the guiding section can, for example, be provided with two guiding portions between which a further gap is formed. The sliding portion, in which friction could occur, is thus drastically reduced and additional space for collecting the accretions is created. A proper guiding of the valve rod is nonetheless provided by the two guiding portions. In an embodiment of the present invention, the guiding portions can, for example, be short in order to avoid larger friction surfaces. Jamming is thus easier to loosen.

In an embodiment of the present invention, the axial height of the two guiding sections can, for example, be smaller or equal to the maximal height of stroke of the valve closing body, whereby, when the valve is in operation, dirt present in the guiding portion can be transported, respectively, into an area outside of the guiding portion.

In an embodiment of the present invention, the two guiding portions are formed with a sharp edge at at least one of their axial ends. These edges serve as scraping edges by which dirt is sheared off from the valve rod as it moves, whereby an intrusion of dirt into the sliding portion is largely prevented. This, in turn, leads to reduced friction and to the avoidance of scratches.

In an embodiment of the present invention, a circumferential recess can, for example, be formed in the valve rod, which, in the closed state of the exhaust gas recirculation valve, is situated immediately adjacent the guiding section or has a short overlap with the guiding section. This section of the valve rod also serves to receive sheared off dirt and thus serves to prevent damage by friction with particles situated in between.

An exhaust gas recirculation valve is thus provided with which the functional disorders of the valve can be minimized by providing a long-lasting tightness along the valve rod and by largely avoiding dirt in the guiding portion subjected to friction, thereby further preventing a jamming of the exhaust gas recirculation valve.

Two embodiments of exhaust gas recirculation valves according to the present invention are illustrated in the drawings and will hereinafter be described.

The exhaust gas recirculation valve illustrated in FIG. 1 is configured as a snap-in valve that can be installed in a manner known per se in a correspondingly formed opening in an exhaust gas recirculation duct. It comprises a housing 2 in which an exhaust gas inlet 4 and an exhaust gas outlet 6 are formed.

A flow cross section to be controlled exists between the exhaust gas inlet 4 and the exhaust gas outlet 6, which cross section is surrounded by a valve seat 8 arranged in the housing 2 and cooperating with a valve closing body 10. The valve closing body 10 is fixedly mounted to a valve rod 12 which is slidably supported in a guide bushing 14 for translational movement therein. The valve rod 12 here is a chrome-plated part sliding in the guide bushing 14 of stainless steel which is fixed in the housing 2 in a correspondingly formed throughbore 16 with a shoulder 17. This shoulder 17 secures the axial position of the guide bushing 14 in the throughbore 16 against a movement of the guide bushing 14 towards the valve closing body 10.

Within this throughbore 16, a lip sealing ring 18 with a support ring 20 is arranged on the side of the guide bushing 14 opposite the valve closing body 10.

At the end of the valve rod 12 opposite the valve closing body 10, a non-illustrated, in particular, electromotive actuator is connected by which the valve rod 12 is movable in a translational manner.

In the housing 2, an annular recess 22 is formed around the valve rod 12 on the actuator side, the annular recess 22 concentrically surrounding the valve rod 12. A helical spring 26 is supported on the bottom 24 of this annular recess 22, which helical spring 26 also surrounds the valve rod 12 and whose opposite end abuts against a plate 28 which is fixed to the valve rod such that it is secured against axial displacement relative to the valve rod 12. The helical spring 26 is situated in a biased state between the bottom 24 and the plate 28 so that the valve closing body 10 is urged against the valve seat 8 by the spring force.

According to the present invention, the guide bushing 14 has a first section 30 facing to the lip sealing ring 18, the inner diameter of the first section 30 being larger than the outer diameter of the valve rod 12 so that a concentric annular gap 32 exists in this first section 30 between the valve rod 12 and the guide bushing 14. The axial extension of this concentric annular gap 32 is at least as large as the maximum stroke of the valve closing body 10.

This first section 30 is joined by a second section that serves as a guiding section 34 and in which the valve rod 12 is slidably supported. In this embodiment, this section 34 is also joined by an enlarged section 36 having a constriction 38 at its end facing to the valve closing body 10, which constriction radially defines a second annular gap 40 arranged concentrically with respect to the valve rod 12.

If the actuator is actuated against the spring force, the valve rod is moved slidingly in the guide bushing 14 towards the valve closing body 10 so that the valve closing body is lifted from the valve seat 8. A free flow cross section is thus formed through which particle-loaded exhaust gas can flow from the exhaust gas inlet 4 toward the exhaust gas outlet 6. As a consequence, conditions may arise, in particular due to the existing exhaust gas pulsations, which conditions cause a pressure gradient in the direction towards the actuator so that small exhaust gas quantities flow along the valve rod towards the actuator. This exhaust gas contains dirt that settles on the valve rod 12 or the guide bushing 14. When the valve is moved, this may lead, due to the necessary small tolerances, to the formation of scratches in the portion sliding in the guide section in any position of the valve. However, these can no longer contact the lip sealing ring 18, since the portion of the valve rod 12 contacting the lip sealing ring 18 does not slide in the guiding section 34 in any position. Thus, no scratches are formed in this portion of the valve rod, which could cause the destruction of the lip sealing ring 18. Instead, the concentric annular gap 32 offers enough space to collect the existing dirt. The same is true for gap 40. It is further possible to remove the dirt from the guiding section 34 by the movement and to contain it in one of the gaps 32, 40.

Figure 2:
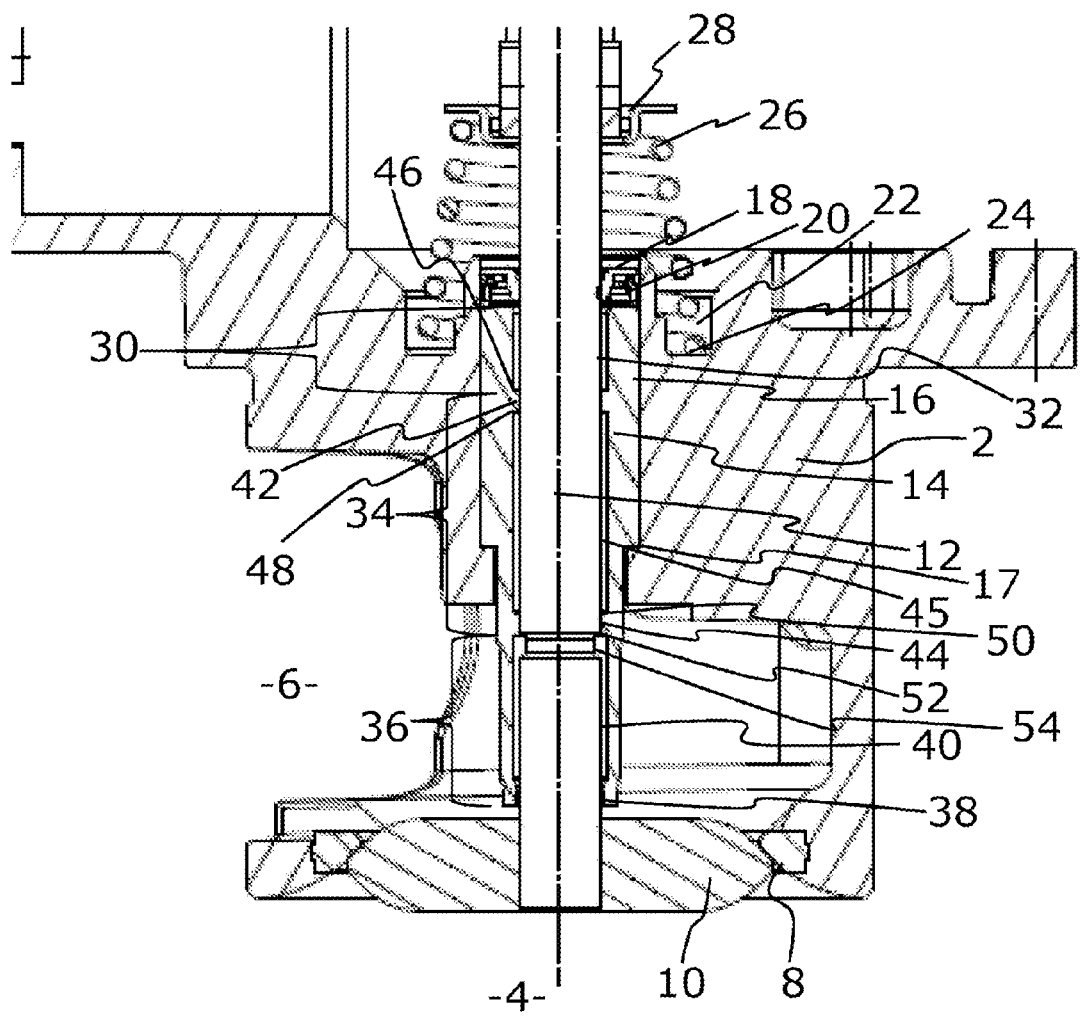
FIG. 2 shows a sectional side elevational view of a detail of a second embodiment of an exhaust gas recirculation valve according to the present invention

The exhaust gas recirculation valve illustrated in FIG. 2 represents a development of the first embodiment, where like reference numerals are used for like components.

Compared to the first embodiment, modifications have been made to the valve rod 12 and the guide bushing 14. In the long, contiguous guiding section 34 of the embodiment in FIG. 1, soot may gather in particular in the middle of the guiding portion, which soot is no longer transported off and eventually causes increased friction. Therefore, the rather long guiding section 34 of the first embodiment is divided into two guiding portions 42, 44 in the embodiment in FIG. 2 which are arranged at the axial ends of the guiding section 34, a gap 45 being formed between the two guiding portions 42, 44 by widening the inner diameter of the guide bushing 14, which gap is longer than the portions. This distance between the two guiding portions 42, 44 is necessary in order to prevent a tilting of the valve rod 12. By reducing the guiding to the two guiding portions 42 and 44 most distant from each other in opposite directions, the guiding geometry with the rod is maintained. At their axial ends, the two guiding portions 42, 44 have edges 46, 48, 50, 52 serving as scraping edges. Dirt on the valve rod 12 are sheared off by these edges 46, 48, 50, 52 as the valve rod 12 moves and therefore, for the greater part, does not reach the two guiding portions 42, 44 at all, but is collected in the gaps 32, 40, 45. It is now achieved by the guiding portions, which are much shorter than the valve stroke, that each contact point of the valve rod 12 with the guiding travels through the respective short two guiding portion 42, 44 more than completely during a full stroke and, thus, the greater part of the particles can be transported out from the contact portion. Moreover, an accumulation of particles is also prevented by the rather large radial force component in these two guiding portions 42, 44 given during the movement of the valve rod 12 and the direct contact of both components.

The guiding portion 44 closer to the valve closing body 10 is located inside the space through which the exhaust gas flows. In the closed state of the exhaust gas recirculation valve, a recess 54 in the valve rod 12 is situated immediately adjacent this guiding portion 44 or with a slight overlap with this guiding portion 44. This recess 54 also serves to receive dirt and causes turbulences that make a straight inflow into the guide portion 44 more difficult.

It is evident that the embodiments described are suited to extend the service life of an exhaust gas recirculation valve, since the portions subjected to mechanical load are reduced. Friction is essentially avoided so that the tightness of the lip sealing ring is maintained and a jamming is largely prevented by a reduction of the sliding portions.

The scope of protection of the claims is not limited to the embodiments described; but various structural modifications are conceivable, in particular, with respect to the scraping edges or the dimensions of the components. Reference should also be had to the appended claims.

What is claimed is:

1. An exhaust gas recirculation valve for an internal combustion engine, the exhaust gas recirculation valve comprising:
    a housing comprising an exhaust gas inlet and an exhaust gas outlet;
    a valve closing body;
    a valve rod to which the valve closing body is fastened, the valve rod being configured to be movable;
    a valve seat arranged between the exhaust gas inlet and the exhaust gas outlet;
    a guide bushing comprising a first section, the guide busing being configured to guide the valve rod in the housing; and
    a sealing ring arranged at an end of the guide bushing remote from the valve closing body;
    wherein the valve closing body is configured to be lowered onto the valve seat by a movement of the valve rod and to be lifted from the valve closing body by an opposite movement of the valve rod,
    wherein, a circumferential gap is formed between the valve rod and the guide bushing in the first section of the guide bushing directed toward the sealing ring, and
    wherein, a height of the circumferential gap is greater or equal to a maximal stroke height of the valve closing body.

2. The exhaust gas recirculation valve as recited in claim 1, wherein the guide bushing further comprises a guiding section, an end of the guiding section facing the valve closing body being formed with a sharp edge.

3. The exhaust gas recirculation valve as recited in claim 2, further comprising a third section adjoining the guiding section in a direction of the valve closing body, the third section comprising a second gap arranged between the guide bushing and the valve rod, and wherein an end of the guide bushing facing the valve closing body comprises a constriction configured to reduce the second gap.

4. The exhaust gas recirculation valve as recited in claim 2, wherein the guiding section comprises guiding portions arranged at axial ends of the guiding section, the guiding portions being configured to form a third gap.

5. The exhaust gas recirculation valve as recited in claim 4, wherein an axial height of the two guiding portions is smaller or equal to a maximum stroke height of the valve closing body.

6. The exhaust gas recirculation valve as recited in claim 4, wherein each of the guiding portions comprises respective axial ends, and wherein at least one axial end of each of the guiding portions has a sharp edge.

7. The exhaust gas recirculation valve as recited in claim 2, wherein the valve rod comprises a circumferential recess, the circumferential recess being configured so that, in a closed state of the exhaust gas recirculation valve, the circumferential recess either immediately adjoins or slightly overlaps the guiding section.

8. An exhaust gas recirculation valve for an internal combustion engine, the exhaust gas recirculation valve comprising:
    a housing comprising an exhaust gas inlet and an exhaust gas outlet;
    a valve closing body;
    a valve rod to which the valve closing body is fastened, the valve rod being configured to be movable;
    a valve seat arranged between the exhaust gas inlet and the exhaust gas outlet;
    a guide bushing comprising a first section, the guide busing being configured to guide the valve rod in the housing; and a sealing ring arranged at an end of the guide bushing remote from the valve closing body;

wherein, the valve closing body is configured to be lowered onto the valve seat by a movement of the valve rod and to be lifted from the valve closing body by an opposite movement of the valve rod, a circumferential gap is formed between the valve rod and the guide bushing in the first section of the guide bushing directed toward the sealing ring, the circumferential gap is shaped as a hollow cylinder surrounding the valve rod, and a height of the circumferential gap is greater or equal to a maximal stroke height of the valve closing body.

* * * * *